United States Patent
Apana et al.

(10) Patent No.: US 7,069,858 B2
(45) Date of Patent: Jul. 4, 2006

(54) METHOD FOR CUSTOM IMPRINTING PLASTIC IDENTIFIER TAGS

(76) Inventors: Dennis Apana, P.O. Box 369, Temple, TX (US) 76503; William E. McCoy, P.O. Box 369, Temple, TX (US) 76503; William L. Nabers, P.O. Box 369, Belton, TX (US) 76503

( * ) Notice: Subject to any disclaimer, the term of this patent is extended or adjusted under 35 U.S.C. 154(b) by 64 days.

(21) Appl. No.: 09/972,020

(22) Filed: Oct. 5, 2001

(65) Prior Publication Data

US 2002/0088362 A1 Jul. 11, 2002
US 2004/0211332 A9 Jul. 11, 2002

Related U.S. Application Data

(63) Continuation-in-part of application No. 09/832,303, filed on Apr. 10, 2001.

(51) Int. Cl.
*B41J 3/407* (2006.01)

(52) U.S. Cl. ............. 101/487; 101/488; 400/120.18; 347/102; 347/106; 40/301; 40/302; 40/625

(58) Field of Classification Search ............... 101/487, 101/488; 347/102, 106, 104, 101; 40/301, 40/302, 625, 300, 626; 400/120.18, 521
See application file for complete search history.

(56) References Cited

U.S. PATENT DOCUMENTS

| | | | | | |
|---|---|---|---|---|---|
| 5,709,484 | A | * | 1/1998 | Dorner | 400/188 |
| 6,022,104 | A | * | 2/2000 | Lin et al. | 347/102 |
| 6,132,038 | A | * | 10/2000 | Szlucha | 347/102 |
| 6,244,700 | B1 | * | 6/2001 | Kimura et al. | 347/102 |
| 6,350,071 | B1 | * | 2/2002 | Conwell et al. | 400/118.2 |
| 6,357,871 | B1 | * | 3/2002 | Ashida et al. | 347/106 |
| 6,467,898 | B1 | * | 10/2002 | Codos et al. | 347/102 |
| 2002/0146265 | A1 | * | 10/2002 | McCoy | 400/120.01 |

* cited by examiner

*Primary Examiner*—Andrew H. Hirshfeld
*Assistant Examiner*—Kevin D. Williams
(74) *Attorney, Agent, or Firm*—David Henry; Robert Greeson

(57) ABSTRACT

The invention is of an improved method and process for printing plastic tag blanks for producing plastic identifier tags (such as cattle ear tags). By printing images on tag blanks using conventional ink jet printer technology and thereafter "welding" the image to be plastic of the printed tag blank, a durable image is provided all the tag without the need for undertaking conventional hot stamp printing with its associated costs, inconveniences, and even safety hazards as associated with the heated metallic print blocks of such conventional method.

12 Claims, 1 Drawing Sheet

METHOD FOR CUSTOM IMPRINTING PLASTIC IDENTIFIER TAGS

CITATION TO PARENT APPLICATION

This is a continuation-in-part application with respect to co-pending U.S. patent application Ser. No. 09/832,303, filed on Apr. 10, 2001 from which priority is claimed.

BACKGROUND OF THE INVENTION

1. Field of the Invention

The present invention relates to plastic identifier tags, such as ear tags used for cattle identification, and processes for their manufacturer.

2. Background Information

Custom-imprinted plastic tags are used in a variety of contexts to identify and/or track items or commodities. This is particularly true in the cattle industry where plastic "ear tags" are used to distinguish cattle of one herd or group from those of others. Merely differentiating the colors of plastic ear tags is not sufficient to adequately identify ownership of cattle, in part, because there are insufficient tag colors available to provide unique identifiers for each owner's cattle, even, for example, in the context of one, large cattle handling facility. Therefore, uniquely identifying indicia (numerals, letters, and/or logos) are printed on plastic tag blanks.

The most cost-effective process for printing plastic ear tag blanks has heretofore involved "hot stamping" images through the use of thermal film ("hot stamp foil"). Using this process, a sufficiently heated, metallic stamp block exhibiting a raised character (a numeral or letter, for example) is pressed against a plastic tag blank with a segment of hot stamp foil positioned therebetween. The thermal "ink" from the hot stamp foil which overlies the raised character on the stamp block is transferred to and thermally welded onto the plastic tag blank.

The hot stamping process has worked well for a number of years, but has certain drawbacks. As already mentioned, hot stamping involves having metallic stamp blocks with raised indicia for transferring the desired images to tag blanks. This, in turn, eliminates any degree of flexibility and spontaneity in choosing and printing images on tag blanks, particularly custom logos, etc. If a custom design is to be printed on a tag blank, a custom stamp block must be produced, often at significant expense relative to the cost of the other elements of tag production. In addition, in the case of producing individually numbered tags, stamp blocks must be changed for each successive tag blank which is hot stamped.

Because of the requirement for changing out stamp blocks as numbers or images are changed from one tag blank printing step to another, persons involved in printing plastic tag blanks are exposed to notable hazards as they manually remove and replace the stamp blocks in close proximity to the dangerously hot surfaces and components of the hot stamp machines.

Clearly, other methods for transferring images onto plastic tag blanks would be faster, simpler, safer to workers, and much more cost-effective. Such methods would include traditional means by which letters and images are applied to plastic surfaces and other industries. However, such conventional methods do not produce images which are durable enough to survive the typical environment in which plastic identifier tags (cattle ear tags, for example) are used. To date, no one has suggested or provided a method by which plastic identifier tags may simply be "printed" in any faster, cheaper, and safer manner than the conventional hot stamp process, while still producing a suitably durable image.

In view of the above, it would well serve the custom imprinted plastic tag industry and its end users to provide an improved process for printing plastic tag blanks, which process obviates the use of heated metallic stamp blocks, yet still applies indicia which is sufficiently durable to satisfy the needs of end users. In addition to eliminating the use of heated metallic stamp blocks with the associated cost and worker hazards such a new process would also ideally provide substantially enhanced flexibility in choosing indicia which would be applied to plastic tag blanks and would involve a degree of simplicity of operation as to make practical the printing of plastic tag blanks by end-users (something which is practically prohibitive in view of equipment costs, difficulties for end users in acquiring needed stamp blocks, and user hazards as are all associated with conventional hot stamp machine technology).

SUMMARY OF THE INVENTION

It is an object of the present invention to provide an improved method for printing plastic identifier tags.

It is another object of the present invention to provide an improved method for printing plastic identifier tags, which method obviates the need for metallic stamp blocks (with indicia appearing in relief on a stamping face thereof) to impart images onto plastic tag blanks.

It is another object of the present invention to provide an improved method for printing plastic identifier tags, which method, when compared to conventional hot stamp printing processes, is more cost-effective, is safer for end users or tag vendor employees, and provides greater flexibility in image selections, yet produces an end product with printed indicia of at least similar durability as that produced through conventional hot stamp processes.

It is another object of the present invention to provide an improved method for printing plastic identifier tags, which method facilitates substantially greater flexibility in choosing and printing images onto plastic tag blanks when compared to conventional hot stamp methods for printing such items.

It is another object of the present invention to provide a method for printing plastic identifier tags, which method substantially reduces costs associated with printing custom images onto plastic tag blanks when compared to conventional hot stamp methods for printing such items.

In satisfaction of these and related objectives, the present invention provides an improved method and process for printing plastic tag blanks for producing plastic identifier tags (such as cattle ear tags). The present method eliminates the need for metallic print blocks and their associated cost, cumbersome exchange during image changes, hazards associated with their handling, and inflexibility of image selection and printing. The present method, in turn, affords substantial flexibility in image selection and printing, is extremely cost-effective, and is of a simplicity which will facilitate tag printing at an end user level.

DETAILED DESCRIPTION OF THE PREFERRED EMBODIMENT

Figure 1:
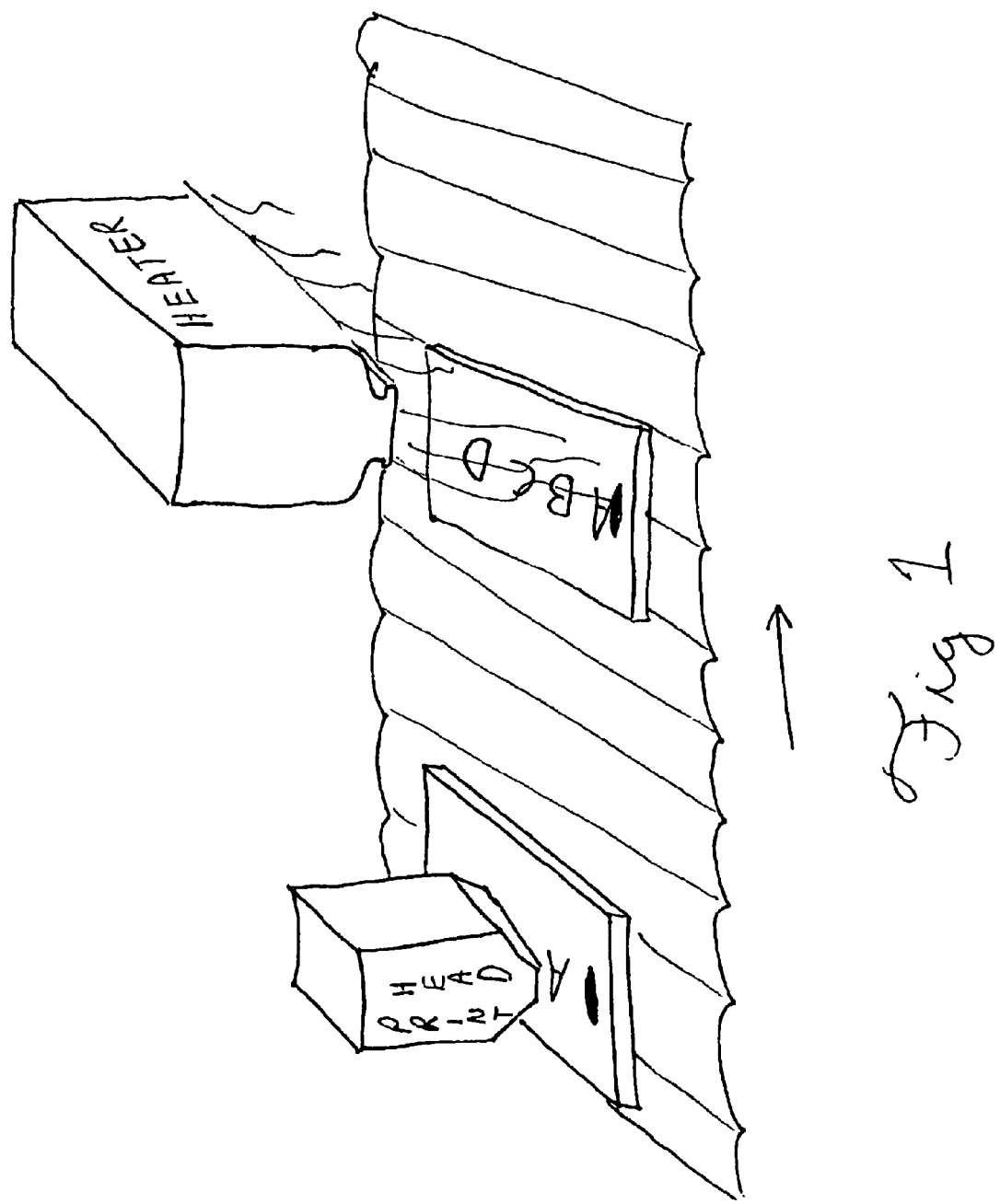
FIG. 1 depicts the physical layout of a tag printing system and method according to the present invention.

Imprinted plastic tags for identifying property (plastic ear tags for cattle, for example) are well-known. These tags are today typically made of polyurethane and are available from a number of suppliers, the supplier presently with the greatest market share being Temple Tag, Inc. of Little River, Tex. The present method involves use of conventional plastic ear tag blanks, and in no way requires changes to such substrate.

Clearly, printing a plastic tag blank with a conventional computer ink jet printer would in no way provide a sufficiently durable image for end-use. However, the current inventors have discovered that just such an image can be "welded" to the plastic tag blank in such a way as to produce an exceptionally durable image.

The present inventors have discovered that one may "weld" an ink jet printed image onto (actually into) a plastic tag blank by impinging the printed tab blank with heated air, or applying radiant heat to the tag blank. The heat source should be selected and positioned such that it effects a tag blank surface temperature of between 350° F. and 400° F. for a duration of between approximately 15 and 20 seconds.

The present inventors have discovered that the described process melts a small amount of a plastic tag's polyurethane material. This small portion of polyurethane allows the printed image, in effect, to simply "sink" into the tag blank's surface (at an apparently microscopic level), whereby a small layer of the tag blank's plastic material disperses over the surface of the tag, including that portion with the ink jet-printed image. The image remains clearly visible, but is protected from abrasion or chemical attack.

After the heat application is discontinued, the dispersed polyurethane solidifies as a substantially impermeable coating over the printed image, thereby rendering the image virtually as durable as the plastic tag member itself.

One example of a heat source that has proven effective is a hot air gun. A testing example was a simple paint stripping type hot air gun which was held at approximately ¼ inch from a printed tag blank for approximately 20 seconds. This operation successfully and optimally sealed the printed image.

Of course, a commercialized version of a system for producing tags according to the present invention will preferably involve a stationary, mounted heat source, likely with actuatable timer cycle circuitry for automatically actuating the hot air source for the prescribed period of time, and for positioning the hot air source in the appropriate position and at the appropriate distance from the tag blank for achieving optimal image sealing. In view of the example provided above, constructing such an arrangement will be well within the skills of anyone even nominally skilled in manufacturing systems design.

Alternatives to hot air sources are, of course, perfectly acceptable, because it is the heat that is impinged at the tag blank surface, not the type of heat generating means that is used, which is important. Alternative heat sources will include electrical resistance heater banks which provide radiant heat, gas-fired burner banks, and even "ovens" of some sort. Batch ovens (those in-line in an assembly line-type arrangement) may be particularly useful for assembly line-type production of printed tag blanks, as the technology for effecting surface temperatures based on heat introduced and dwelling time in ovens is a well-established area of technology in a number of industries (solder re-flow operations in printed circuit board manufacturing, for example, and even certain pre-prepared food preparation operations).

Although not tested to date, even microwave ovens (particularly with the use of "browning vessels" may be effective in sufficiently melting the tags to achieve the desired results). Finally, heated platens which actually contact the surface of the tag blank may be used, although this is not believed to be an optimal method, because directly contact with the printing indicia may involve some of the indicia and/or melted tag material sticking to the platen when it is removed.

The ability to print images on plastic tag blanks affords numerous advantages over conventional hot stamp tag printing processes. As will be evident to anyone who uses a computer and ink jet printer (or any other type of computer, graphics-capable printer) to any typical degree, one may design and print limitless image variations using a computer and ink jet printer combination. In addition, any number of software packages will provide for printing of sequential numbers or letters, and even bar codes. Therefore, anything that can be readily printed with a computer and attached the jet printer can now quickly and easily be applied to a plastic tag blank.

The present method obviates the need for custom produced metallic print blocks and in during the associated delays in being able to print custom images. Because changing numbers, letters, images, etc. merely involves changing that which the computer sends to the printer, vendor workers and end users need never so closely handle dangerously heated components as is necessary when changing images in association with a conventional hot stamp process.

Because end users of plastic tags (cattle ranchers and feed lot operators, for example) can be provided user-friendly software packages for printing their tags, along with (if desired) pre-loaded image files with the end-users' custom logos, etc., end-user use of the present process for printing plastic identification tags is highly feasible and will be viable from a cost standpoint.

Clearly, the conventional ink jet printer will not, in its original, retail form, have suitable carriers for holding plastic tag blanks during their printing. However, modifications of existing printers for permitting the printing of nonstandard media is well within the knowledge and skill sets of computer hardware modifiers, and need not be detailed here are to provide an enabling disclosure. Once suitable carriers are provided for the jet printers selected for use with the present process, printing proceeds substantially as if mere paper sheets were being printed sequentially with desired images thereon.

Also evident is the fact that devices used to apply the heat to the juxtaposed tag blank can be of a wide range of complexity and automation. In theory (if not in practicality) one could practice the present method through use of a hand-held paint stripping hot air gun, as described above. However, it is envisioned that some degree of automation and custom-designed machinery will be desirable. Such machinery must merely include a sufficiently heated air or radiant energy source to deliver sufficient heat to the surface of a printed tag blank after the blank is printed.

In any event, the specific machinery used to carry out the present method is not part of the present invention (although such may be the subject of a later, continuation-in-part patent application). Rather the invention, at present, is of the method which, at its heart, involves heat sealing, or "welding," printer-deposited images (whether of ink or suitable paint) onto plastic tag blanks using any heat source which effects a surface temperature on a printed plastic tag blank sufficient to "weld" the printed image into the melted plastic material to form an encapsulated shield which will protect the printed image after processing.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:

1. An improved process for imprinting plastic identification tags with durable indicia comprising the steps of:

selecting a plastic tag blank consisting essentially of a substantially solid, unitary body of plastic material and including a substantially smooth exterior surface;

printing indicia on said substantially smooth exterior surface of said plastic tag blank to produced a printed surface of said plastic tag blank; and through use of heat means, effecting a surface temperature of said printed surface of said plastic tag blank sufficient to partially melt said printed surface of said plastic tag blank to weld said indicia to said plastic tag blank.

2. The method of claim 1 wherein said heating means is a hot air source.

3. The method of claim 1 wherein said heating means is a radiant heat source.

4. The method of claim 1 wherein said heating means is an electrical resistance radiant heat device.

5. The method of claim 1 wherein said surface temperature is between approximately 350° F. and 400° F.

6. The method of claim 1 wherein said printing is effected through use of a computer-driven printer.

7. The method of claim 2 wherein said printing is effected through use of a computer-driven ink jet printer.

8. The method of claim 3 wherein said printing is effected through use of a computer-driven printer.

9. The method of claim 4 wherein said printing is effected through use of a computer-driven ink jet printer.

10. The method of claim 5 wherein said printing is effected through use of a computer-driven printer.

11. An improved process for imprinting plastic identification tags with durable indicia consisting essentially of the steps of:

selecting a plastic tag blank consisting essentially of a substantially solid, unitary body of plastic material and including a substantially smooth exterior surface;

printing indicia on said substantially smooth exterior surface of said plastic tag blank to produced a printed surface of said plastic tag blank; and through use of heat means, effecting a surface temperature of said printed surface of said plastic tag blank sufficient to partially melt said printed surface of said plastic tag blank to weld said indicia to said plastic tag blank.

12. The method of claim 11 wherein said surface temperature is between approximately 350° F. and 400° F.

* * * * *